Figure 1:
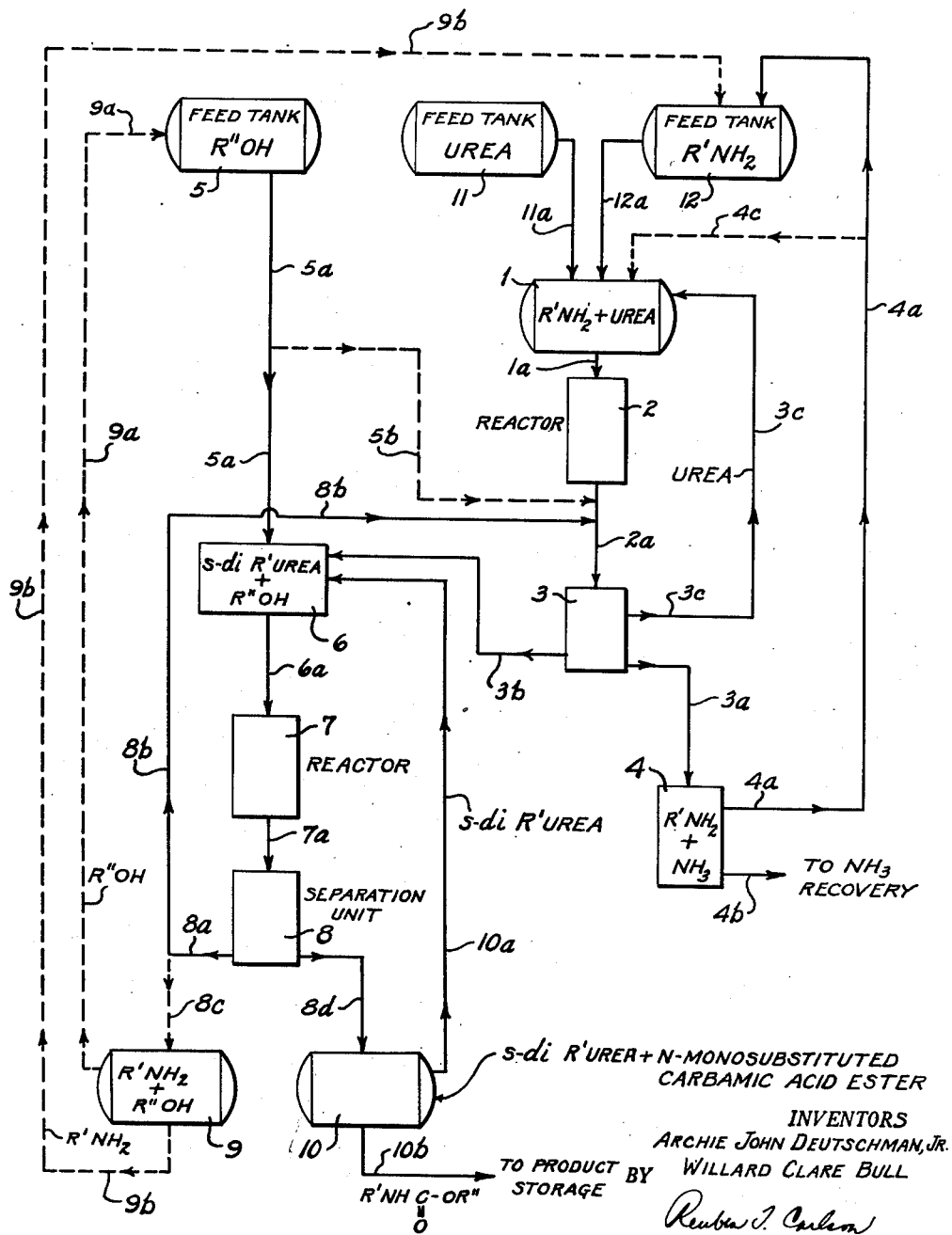

Patented May 4, 1954

2,677,698

UNITED STATES PATENT OFFICE 2,677,698

PREPARATION OF N-MONOSUBSTITUTED CARBAMIC ACID ESTERS

Archie John Deutschman, Jr., Columbus, Kans., and Willard Clare Bull, Joplin, Mo., assignors to Spencer Chemical Company, Kansas City, Mo., a corporation of Missouri Application August 1, 1950, Serial No. 177,066

8 Claims. (Cl. 260—482)

This invention relates to the preparation of carbamic acid esters, and more particularly to that class of carbamic acid esters which carry only a single substituent on the nitrogen atom which characterizes the carbamate grouping, and which may be conveniently referred to as N-monosubstituted carbamic acid esters.

Compounds of the class of N-monosubstituted carbamic acid esters find useful application as wetting agents, textile and paper treatment assistants, anthelmintics, germicides, anti-pyretics, intermediates in the preparation of dyes, and as intermediates in the preparation of plastics and plasticizing agents. Some of these compounds, particularly the lower alkyl substituents, when further reacted to form N-alkyl-N-nitrocarbamic acid esters, are useful as diesel fuel additives according to the teachings of Pollock in U. S. Patent 2,438,452.

Various non-cyclic or batch methods and procedures have heretofore been suggested and used in the manufacture of these compounds, such as the reaction of methyl chloroformate with aqueous methylamine, the reaction of methyl isocyanate with diazo methane, the reaction of sodium alcoholate and anhydrous methanol on n-brom acetamide or n-brom isobutyramide, or the reaction of alkyl or aryl isocyanates with anhydrous alcohols. These prior art procedures involve the use of dangerous raw materials such as the isocyanates and chloroformates, or high cost raw material reagents such as the halogen-substituted amides or sodium alcoholate, which are partially lost in the process of manufacture without becoming a part of the desired compounds.

An object of this invention is to provide a simple and economical process for the manufacture of N-monosubstituted carbamic acid esters from relatively low cost and readily available raw materials, which can be safely handled and processed, which is characterized by high output yields, and which is flexibly adapted to the manufacture of numerous commercially valuable specific chemicals of this general classification.

A further object of this invention is to provide an improved process for the continuous cyclic production of various desirable chemicals falling in the general classification of N-monosubstituted carbamic acid esters, which permits recovery of the unreacted or regenerated components for recycle and reuse in prior or subsequent steps in the process with resultant high raw material efficiencies and without loss or waste of valuable components.

Other objects and advantages of this invention will become apparent as the disclosure proceeds.

The improved process of this invention may be advantageously applied to the production of numerous compounds falling within the broad classification of compounds described by the following formula:

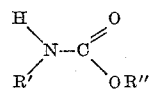

wherein the initial source of the R' is the corresponding primary amine, and the initial source of R'' is the corresponding monohydroxy compound. Numerous specific chemical compounds within this broad classification may be readily produced in accordance with this process by an appropriate selection of the R' amine compound and the R'' monohydroxy compound from the alkyl, aryl, heterocyclic, alicyclic groups or any combination of them, and which group or groups may or may not carry additional substituents such as sulfate, sulfon, sulfonyl, phosphate, nitrate, nitro, nitroso, keto, ether, or other common organic or inorganic linkages on the hydrocarbon portion of the compound.

These various products can be economically produced by this improved process in accordance with the equation:

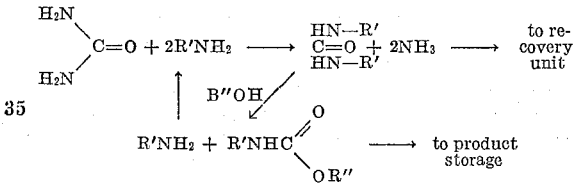

The ammonia involved in the process is fully recovered and may be conducted to other process units utilizing ammonia as a raw material for credit, or it may be used as a raw material in the associated urea or amine manufacturing process and thus indirectly recycled to the process. The regenerated amine may be recovered as substantially pure amine and then recycled for reuse in the initial step of the process, or the amine may be recovered in admixture with the excess monohydroxy compound employed and the mixture recycled for reuse at an intermediate step in the process. In carrying out the process, it will be found that a moderate amount of unreacted symmetrical disubstituted urea can readily be recovered from the second reaction mixture and recycled for reuse to an intermediate step in the process. Some unreacted amine and unreacted urea is also produced from the initial reaction step which can also be readily recoverd and recycled for reuse.

This improved process is thus flexibly adapted to the production of numerous specific chemicals within the broad clasification of N-monosubstituted carbamic acid esters substantially without loss or waste of any of the raw materials used, and with accompanying high conversion efficiency. The process is adapted for continuous low-cost production operations, with the various by-products and unreacted or regenerated compounds either recycled for reuse in the process or used in the manufacture of other by-product chemicals.

Figure 2:
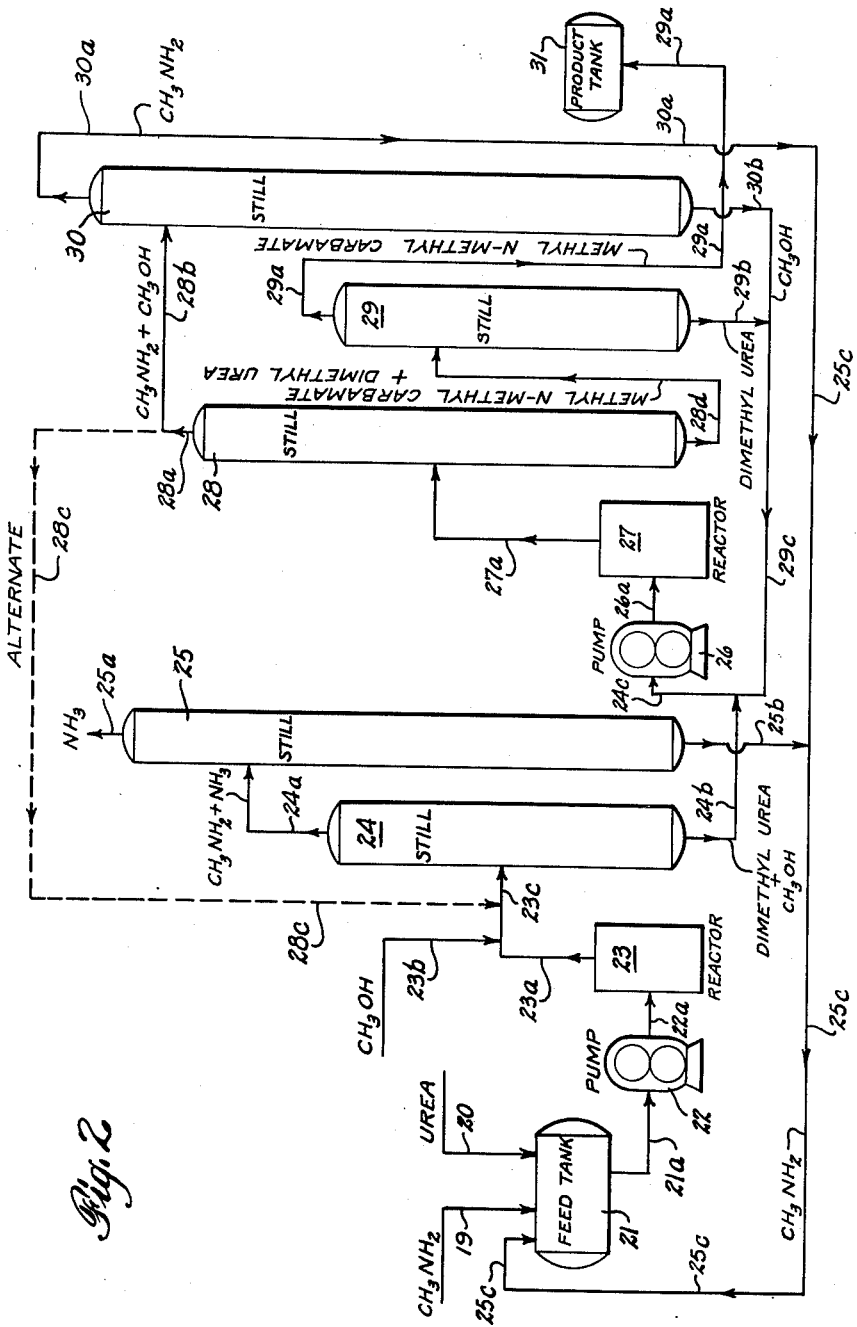

As a further exemplification of this improved process, reference is made to the accompanying drawings, in which:

Fig. 1 is a schematic flow diagram illustrating the general application of this continuous process to the production of various chemicals falling within the broad classification of N-monosubstituted carbamic acid esters; and Fig. 2 is a schematic flow diagram for the production of methyl-N-methyl carbamate as a specific chemical within this general classification.

Similar reference characters refer to similar parts throughout the drawings and the following description.

In the production of N-monosubstituted carbamic acid esters by this continuous process as illustrated in Fig. 1, urea contained in feed tank 11 and primary amine contained in feed tank 12 are conducted through lines 11a and 12a to a mixing vessel 1 where the urea and amine are thoroughly mixed in the proportion of not less than two moles of amine per mole of urea. The urea-amine mixture is removed from the mixing vessel 1 through line 1a and conducted to a reaction vessel 2, where the mixture is heated to a reaction temperature of from 100° C. to 250° C. The reaction vessel 2 is of such size and character as to permit retention of the mixture therein for periods up to twenty hours and to withstand the reaction temperatures and pressures generated.

From the reaction vessel 2, the reaction mixture is conducted through line 2a to a separation unit 3 wherein the excess amine and the ammonia fraction generated by the reaction are removed through line 3a, leaving a mixture of 1,3-disubstituted urea and unreacted urea in the separation unit 3. The excess amine and ammonia removed through line 3a may be conducted to a stripping vessel 4 where the ammonia is stripped from the amine and sent through line 4b to an ammonia recovery unit (not shown). The excess amine recovered from the stripping vessel 4 may be recycled through line 4a to the amine feed tank 12 or through by-pass line 4c to the mixing vessel 1.

It is generally desirable to remove the unreacted urea from the 1,3-disubstituted urea since the unreacted urea will otherwise form a simple unsubstituted carbamic acid ester later in the process and thus require more expensive purification of the final product. However, a modest quantity of unreacted urea in the 1,3-disubstituted urea will not interfere with the subsequent operation of the process. The unreacted urea in the separation unit 3 may be removed by solvent extraction or other known means, but where the more complex derivatives of urea are invloved, water is preferably used as the solvent medium. The unreacted urea is extracted in solution from the separation unit 3, and may be recovered and recycled through line 3c to the mixing vessel 1, or if desired, the unreacted urea solution may be used as the fertilizing component in irrigation water, or may be otherwise disposed of according to the particular economics of the plant location.

A selected monohydroxy compound referred to as R″OH and contained in feed tank 5, is conducted through line 5a to a mixing vessel 6 where the monohydroxy compound is thoroughly mixed with the 1,3-disubstituted urea drawn from the separation unit 3 through line 3b. These components are blended in the mixing vessel 6 in the proportions of not less than one mole of R″OH per mole of 1,3-disubstituted urea.

After thorough mixing, the mixture in vessel 6 containing not less than one mole of R″OH per mole of 1,3-disubstituted urea, is passed through line 6a to a reaction vessel 7 where the mixture is heated from 100° C. to 250° C. under pressures from atmospheric to substantially above autogenous pressure for a period of up to twenty hours.

This reaction mixture from vessel 7 is then passed through line 7a to a separation unit 8 where preferably two fractions are secured, the first fraction containing substantially regenerated R′NH₂ and excess R″OH, and the second fraction containing substantially the desired N-monosubstituted carbamic acid ester and unreacted 1,3-disubstituted urea. The second fraction may or may not also contain modest amounts of unsubstituted carbamic acid ester.

The first fraction containing regenerated R′NH₂ and excess R″OH is withdrawn from the separation unit 8 through line 8a and thence may be conducted through line 8b to the separation unit 3 where the regenerated amine (R′NH₂) is separated out and flows into line 4a as previously described, and the excess monohydroxy compound (R″OH) is returned through line 3b to the mixing vessel 6. As an alternative procedure, the first fraction containing regenerated R′NH₂ and excess R″OH may be conducted from discharge line 8a through branch line 8c to a separation unit 9, where the R″OH is separated out and recycled through line 9a to the R″OH feed tank 5, and the recovered R′NH₂ is recycled through line 9b to the amine feed tank 12.

The second fraction containing unreacted 1,3-disubstituted urea and the desired N-monosubstituted carbamic acid ester recovered from the separation unit 8, is drawn off through line 8d and conducted to a further separation unit 10 where the unreacted 1,3-disubstituted urea is separated and recovered and then recycled through line 10a back to the mixing vessel 6. The remainder is substantially pure N-monosubstituted carbamic acid ester, which is drawn off from separation unit 10 through line 10b. The N-monosubstituted carbamic acid ester recovered through line 10b may or may not require further purification to remove small amounts of unsubstituted carbamic acid ester. The amount of purification necessary is dependent on the product specification requirements and the extent to which the unreacted urea had been previously removed in separation unit 3.

Various modified steps and procedures from that above described may also be employed to effect recovery of the desired end products. For example, part of the R″OH from feed tank 5 may be by-passed through line 5b and added to the urea and amine reaction mixture supplied to the separation unit 3, and the excess R″OH withdrawn with the 1,3-disubstituted urea through line 3b and supplied to the mixing vessel 6, in which event additional R″OH is supplied to the mixing vessel 6 directly through line 5a from feed tank 5 so that the material in vessel 6 is in the proportion of not less than one mole of R″OH per mole of 1,3-disubstituted urea.

The separation steps carried out in separation units 3, 4, 8, 9 and 10, may be effected by various separation procedures such as distillation, filtration, crystallization, solvent extraction, decantation or sedimentation. The choice of the particular method or methods of separation, and the order of separation of various components or fractions of the processed mixture is determined in part by the physical constants such as the melting point, boiling point, viscosity, solubility in solvents, mutual or synergistic solubilities and azeotropic tendencies, and in part by the stability and heat sensitiveness of the particular components of the mixture, as obvious to those skilled in the art.

As a further exemplification of the use of this improved process in the production of a particular chemical within the general classification of N-monosubstituted carbamic acid esters, a process flow diagram is illustrated in Fig. 2 which may be employed in the preparation of methyl-N-methyl carbamate (methyl ester of N-methyl carbamic acid). As shown in Fig. 2, monomethylamine is supplied through feed line 19 to feed tank 21 along with urea supplied through feed line 20, in the proportions of approximately 10 moles of monomethylamine per mole of urea. The monomethylamine and urea as thus proportioned is drawn from the feed tank 21 through line 21a and thoroughly mixed in pump 22. The monomethylamine and urea mixture discharged from pump 22 passes through line 22a into a reaction vessel 23 where the mixture is reacted at a temperature between 150° C. and 220° C. at atmospheric pressure to 1500 p. s. i. g. or higher but preferably about 500 p. s. i. g. for a period up to twenty hours.

The reaction mixture produced in reaction vessel 23 is drawn off through line 23a and thence conducted through line 23c to a fractionating still 24. Methyl alcohol supplied through feed line 23b is run into line 23c in an amount sufficient to produce a readily flowable bottoms product in the still 24. The excess amine and by-product ammonia are removed from the still 24 through overhead line 24a and conducted to a second fractionating still 25 which separates the ammonia from the amine. The ammonia is removed overhead through line 25a and conducted to any desired recovery unit (not shown). The amine is separated out in the fractionating still 25 as a methylamine bottoms product, and is drawn off through line 25b and thence conducted into the amine recycle line 25c where it is recycled back to the feed tank 21 for reuse.

The bottoms product produced in the fractionating still 24 is composed of methyl alcohol and 1,3 - dimethylurea, with normally negligible amounts of unreacted urea. This bottoms product is drawn off through line 24b and thence conducted to line 24c where it is joined by recycle methyl alcohol and recycle 1,3-dimethylurea produced at later stages in the process and supplied in line 24c through line 29c as will hereafter be described. The directly introduced and recycle methyl alcohol and the directly produced and recycle 1,3-dimethylurea flowing through line 24c are conducted to pump 26 and thoroughly mixed. This mixture is discharged from the mixing pump 26 through line 26a into a reaction vessel 27.

The methyl alcohol and 1,3-dimethylurea mixture is reacted in the reaction vessel 27 in the mole ratio of approximately 25 moles of methyl alcohol to one mole of 1,3-dimethylurea for a period up to twenty hours at a temperature of from 100° C. to 200° C. and at pressures from atmospheric to substantially above autogenous pressure. The reaction products from reaction vessel 27 flow through line 27a to a fractionating still 28 where the excess methyl alcohol and regenerated methylamine are removed overhead through line 28a for recycle. The bottoms product recovered from the fractionating still 28, consisting substantially of methyl-N-methyl carbamate formed in the reaction vessel 27 and some unreacted 1,3-dimethylurea is drawn off through bottoms line 28d and thence conducted to a fractionating still 29 for further separation.

In the fractionating still 29, the methyl-N-methyl carbamate is drawn off from the top thereof through line 29a as the final end product and may be conducted to a product storage tank 31. The unreacted 1,3-dimethylurea separates out in the still 29 as a bottoms product, and is drawn off through line 29b and recycled through line 29c back to the pump 26 where it is mixed with the methyl alcohol and 1,3-dimethylurea supplied thereto through line 24b as previously described.

The excess methyl alcohol and regenerated methylamine components removed from the still 28 through outlet line 28a may be separated by running the component mixture through line 28b into a fractionating still 30 where the methylamine is removed through overhead line 30a and then returned through recycle line 25c to the feed tank 21. The methyl alcohol, separating out as a bottoms product in the still 30, is withdrawn through line 30b and fed into the recycle line 29c and thence returned to the mixing pump 26. Thus the mixing pump 26 receives unreacted methyl alcohol and 1,3-dimethylurea from the fractionating still 24 supplied through line 24b, unreacted 1,3-dimethylurea from the fractionating still 29 supplied through line 29b, and may also receive methyl alcohol from the still 30 supplied through line 30b.

As an alternative procedure, the unreacted methyl alcohol and regenerated methylamine removed from the still 28 through the overhead conduit 28a may be recycled through line 28c back to the fractionating still 24 where these recycled components join with the reaction products discharged from reaction vessel 23, thereafter comprising essentially a mixture of 1,3-dimethylurea, unreacted methyl alcohol and unreacted and regenerated methylamine as heretofore described. Where the excess methyl alcohol and regenerated methylamine separated in still 28 are recycled back to still 24 through the recycle line 28c, the fractionating still 30 designated for the separation of these two components may be eliminated.

In the process for the production of methyl-N-methyl carbamate as above described and illustrated in Fig. 2, it will be noted that the unreacted and regenerated components produced at various stages of the process may be recycled back to a selected earlier stage in the process for reuse, with no waste by-product resulting. The process is thus flexibly adapted to various alternatives which may be selectively combined to insure maximum economy in operation. The free ammonia released from the fractionating still 25 is the only by-product generated which is not directly returned for reuse in the process. However, this free ammonia discharged into line 25a may be advantageously used in the production of monomethylamine or urea as feed stocks for the process, or may be converted to other valuable uses.

While the process illustrated in Fig. 2 and above described is particularly adapted for the continuous production of methyl - N - methyl carbamate, apparatus similar to that illustrated in Figs. 1 and 2, with slight changes in reaction conditions obvious to those skilled in the art, may be used to produce other valuable N-monosubstituted carbamic acid ester products whose R' and R'' radicals carry alkyl, aryl, alicyclic, heterocyclic groupings or any combination of these four groupings, with or without additional substituents such as sulfate, sulfon, sulfonyl, phosphate, nitrate, nitro, nitroso, keto, ether, or other common organic or inorganic linkages on the hydrocarbon portion of the compound.

For example, practice of the process above disclosed may be effectively used for the manufacture of the allyl, p-bromphenyl, cyclohexyl, ethyl, heptyl, isobutyl, isopropyl, methyl, phenyl, propyl and tetrahydrofurfuryl esters of -N-methyl carbamic acids; the allyl, n-amyl, d-amyl, dl-amyl, n-butyl, cyclohexyl, ethyl, n-hexyl, isoamyl, isobutyl, isopropyl, methyl, n-octyl, n-propyl, phenyl and sec.-butyl esters of -N-phenyl carbamic acids; the isobutyl, isopropyl, ethyl, and methyl esters of -N-n-butyl carbamic acids; the ethyl, methyl, isobutyl, and isopropyl esters of -N-iso-butyl carbamic acids; the ethyl, methyl, isobutyl and isopropyl esters of -N-iso-propyl carbamic acids; the isopropyl and ethyl esters of -N-p-bromphenyl carbamic acids; the ethyl and $CHMe_2$ esters of N-p-nitrophenyl carbamic acids; the ethyl and methyl esters of -N-ethyl carbamic acids; and the ethyl and methyl esters of -N-sec. butyl carbamic acids. In addition, practice of this process may also be used in the manufacture of ethyl-N-butyl carbamate, ethyl-N-allyl carbamate, methyl-N-tert.-butyl carbamate, methyl-N-$Et_2CH$ carbamate, ethyl-N-p-chlorophenyl carbamate, ethyl-N-m-nitrophenyl carbamate, methyl-N-stearyl carbamate, ethyl-N-cyclohexyl carbamate, methyl-N-cyclohexyl carbamate, and various methyl-N-aryl carbamates.

Where the finished products such as isopropyl-N-phenyl carbamate, are normally solids, or where the reactants used, such as the disubstituted ureas, phenols and higher alcohols, are normally solids, the process as illustrated in Figs. 1 and 2 may be equipped with separation units which take the form of filters, centrifuges, decanters or other suitable separation devices. In some cases, reslurrying of the solid intermediates, as well as the separation and recycling of certain of the unreacted or regenerated compounds at various points in the process, may yield desirable economies in the operation, as would be obvious to those skilled in the art. Where one or both reactants are normally solids, or where the reactants have melting points in the reaction temperature range or higher, inert solvents or reaction media may be employed within the contemplation of this invention to facilitate handling problems.

While the use of pressures ranging from atmospheric up to the autogenous pressure of the reactants generally results in desirable economies in operation, it will be understood that pressures below atmospheric or above autogenous may be used without departing from the spirit of this invention.

While certain embodiments of this improved process have been shown and described to illustrate the broad aspects of this invention, it will be understood that various modifications and changes may be made in this process, as indicated to those skilled in the art by the end product desired, the reaction conditions created, the raw materials used, and the attainment of desirable economies in operation, without departing from the spirit of this invention.

What is claimed is:

1. A process for the production of N-monosubstituted carbamic acid esters which comprises, reacting a primary amine with urea at a reaction temperature in the order of 100° C. to 250° C. and in a mole ratio substantially in excess of two moles of amine per mole of urea, thereafter separating substantially all of the unreacted amine and the generated ammonia from said reaction mixture leaving substantially 1,3-disubstituted urea, producing a second reaction mixture by reacting the 1,3-disubstituted urea with a monohydroxy alcohol at a reaction temperature in the order of 100° C. to 200° C. and in a mole ratio substantially in excess of one mole of alcohol per mole of 1,3-disubstituted urea, and thereafter separating the resultant N-monosubstituted carbamic acid ester from said second reaction mixture.

2. A process for the preparation of N-monosubstituted carbamic acid esters which comprises, initially reacting a primary amine with urea at a reaction temperature in the order of 100° C. to 250° C. and in a mole ratio substantially in excess of three moles of amine per mole of urea, thereafter separately recovering the generated ammonia and 1,3-disubstituted urea from said initial reaction mixture, producing a second reaction mixture by reacting the recovered 1,3-disubstituted urea with a monohydroxy alcohol at a reaction temperature in the order of 100° C. to 200° C. and in a mole ratio substantially in excess of five moles of monohydroxy alcohol per mole of 1,3-disubstituted urea, thereafter separating the resultant N-monosubstituted carbamic acid ester from said second reaction mixture.

3. A process for the production of N-monoalkyl carbamic acid alkyl esters which comprises reacting a primary alkyl amine with urea at a reaction temperature in the order of 100° C. to 250° C. and in a mole ratio substantially in excess of two moles of amine per mole of urea, thereafter separating substantially all of the unreacted amine and the generated ammonia from said reaction mixture leaving substantially 1,3-dialkyl urea, producing a second reaction mixture by reacting the 1,3-dialkyl urea with a monohydroxy alkyl alcohol at a reaction temperature in the order of 100° C. to 200° C. and in a mole ratio substantially in excess of one mole of alcohol per mole of 1,3-dialkyl urea, and thereafter separating the resultant N-monoalkyl carbamic acid alkyl ester from said second reaction mixture.

4. A process for the production of N-monoalkyl carbamic acid alkyl esters which comprises, reacting a primary alkyl amine with urea at a reaction temperature in the order of 100° C. to 250°

C. and in a mole ratio substantially in excess of three moles of amine per mole of urea, thereafter separating substantially all of the generated ammonia and unreacted amine from said reaction mixture and recovering substantially 1,3-dialkyl urea therefrom, producing a second reaction mixture by reacting the 1,3-dialkyl urea with a monohydroxy alkyl alcohol at a reaction temperature in the order of 100° C. to 200° C. and in a mole ratio substantially in excess of five moles of alcohol per mole of 1,3-dialkyl urea thereafter separating the resultant N-monoalkyl carbamic acid alkyl ester from said second reaction mixture.

5. A process for the production of N-monoalkyl carbamic acid alkyl esters which comprises initially reacting a primary lower alkyl amine with urea at a reaction temperature in the order of 100° C. to 250° C. and in a mole ratio substantially in excess of two moles of amine per mole of urea, thereafter separating from said initial reaction mixture substantially all of the generated ammonia and unreacted amine and recovering substantially 1,3-dialkyl urea therefrom, producing a second reaction mixture by reacting the recovered 1,3-dialkyl urea with a monohydroxy lower alkyl alcohol at a reaction temperature in the order of 100° C. to 200° C. and in a mole ratio substantially in excess of one mole of alcohol per mole of 1,3-dialkyl urea, and separating the resultant N-monoalkyl carbamic acid alkyl ester from said second reaction mixture.

6. A process for the production of N-monoalkyl carbamic acid alkyl esters which comprises, initially reacting a primary lower alkyl amine with urea at a reaction temperature in the order of 100° C. to 250° C. and in a mole ratio substantially in excess of three moles of amine per mole of urea, thereafter separating from said initial reaction mixture substantially all of the generated ammonia and unreacted amine and recovering substantially 1,3-dialkyl urea therefrom, producing a second reaction mixture by reacting the recovered 1,3-dialkyl urea with a monohydroxy alkyl alcohol at a reaction temperature in the order of 100° C. to 200° C. and in a mole ratio substantially in excess of five moles of alcohol per mole of 1,3-dialkyl urea, and separating the resultant N-monoalkyl carbamic acid alkyl ester from said second reaction mixture.

7. A process for the production of methyl N-methyl carbamate which comprises, reacting monomethylamine with urea at a reaction temperature in the order of 100° C. to 250° C. and in a mole ratio substantially in excess of two moles of amine per mole of urea, thereafter separating substantially all the unreacted monomethylamine and the ammonia generated during the reaction from said reaction mixture leaving substantially 1,3-dimethyl urea, producing a second reaction mixture by reacting the 1,3-dimethyl urea with methanol at a temperature in the order of 100° C. to 200° C. and in a mole ratio substantially in excess of one mole of methanol per mole of 1,3-dimethyl urea, thereafter separating the resultant methyl N-methyl carbamate from said second reaction mixture.

8. A process for the production of methyl N-methyl carbamate which comprises reacting monomethylamine with urea at a reaction temperature in the order of 100° C. to 250° C. and in a mole ratio substantially in excess of three moles of amine per mole of urea, thereafter separating substantially all the unreacted monomethylamine and the ammonia generated during the reaction from said reaction mixture leaving substantially 1,3-dimethyl urea, producing a second reaction mixture by reacting the 1,3-dimethyl urea with methanol at a temperature in the order of 100° C. to 200° C. and in a mole ratio substantially in excess of five moles of methanol per mole of 1,3-dimethyl urea, thereafter separating the resultant methyl N-methyl carbamate from said second reaction mixture.

References Cited in the file of this patent

UNITED STATES PATENTS

| Number | Name | Date |
| --- | --- | --- |
| 1,785,730 | Davis | Dec. 23, 1930 |
| 2,253,528 | Olin | Aug. 26, 1941 |

FOREIGN PATENTS

| Number | Country | Date |
| --- | --- | --- |
| 531,030 | Great Britain | Dec. 27, 1940 |